April 22, 1941.  W. OWEN  2,239,537

GLASS BLOCK MOUNTING

Filed April 1, 1939  2 Sheets-Sheet 1

INVENTOR
WILLIAM OWEN
BY Olew E. Bee
ATTORNEY

April 22, 1941.  W. OWEN  2,239,537
GLASS BLOCK MOUNTING
Filed April 1, 1939  2 Sheets-Sheet 2

INVENTOR
WILLIAM OWEN
BY Olew E. Bee
ATTORNEY

Patented Apr. 22, 1941

2,239,537

UNITED STATES PATENT OFFICE 2,239,537

GLASS BLOCK MOUNTING

William Owen, Pittsburgh, Pa., assignor to Pittsburgh Plate Glass Company, Allegheny County, Pa., a corporation of Pennsylvania Application April 1, 1939, Serial No. 265,535

4 Claims. (Cl. 72—42)

The present invention relates to wall constructions and more particularly to a mounting for glass blocks by means of which they may be utilized in the formation of walls.

One object of the invention is to provide an improved frame support for vitreous wall constructions.

Another object of the invention is the provision of horizontal members which are adapted to support and retain in position successive tiers of glass blocks, with the elimination of the customary cement or mortar.

Other objects and advantages of the invention will become more apparent from the following detailed description of certain preferred embodiments thereof.

Glass blocks have become of increasing importance as a construction material, especially where it is desired to retain maximum natural illumination. Ordinarily glass blocks are assembled in a wall by means of mortar or cement as was the practice with standard solid bricks. Unfortunately the smooth surfaces of glass blocks do not permit a strong bond with mortar, and accordingly many ingenious schemes have been devised to increase this bond. For example, the surfaces of the glass block have been roughened or even provided with alternate projections and recesses to form a true interlocking union with a layer of mortar. More recently there has been developed a synthetic resin coating for the edges of glass brick to which the mortar used in setting the blocks will adhere very tenaciously. I am also aware that solid metal spacers have been used to reinforce the wall structure in combination with mortars and cements of various types.

Briefly stated, the present invention contemplates the erection of walls or similar constructions from glass bricks which are not specially treated for such use and in which mortar or cement is not necessary.

Certain preferred embodiments of the invention are shown in the accompanying drawings wherein Figure 1 is a fragmentary elevation of a wall composed of glass blocks united in accordance with the principles of my invention.

Figure 1:
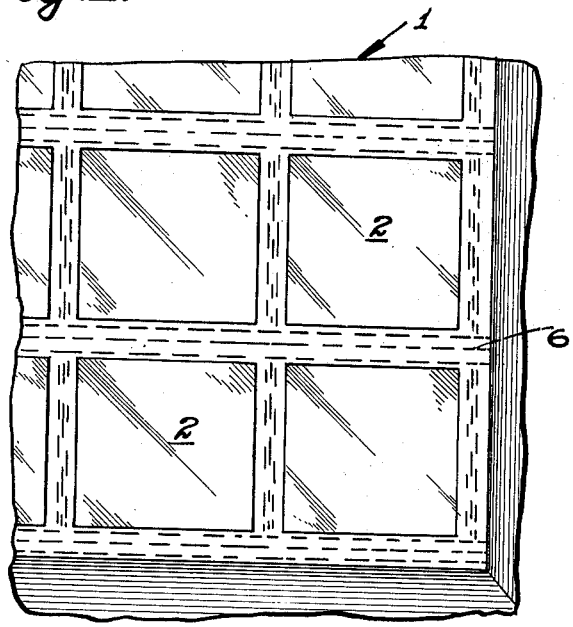
Figure 2:
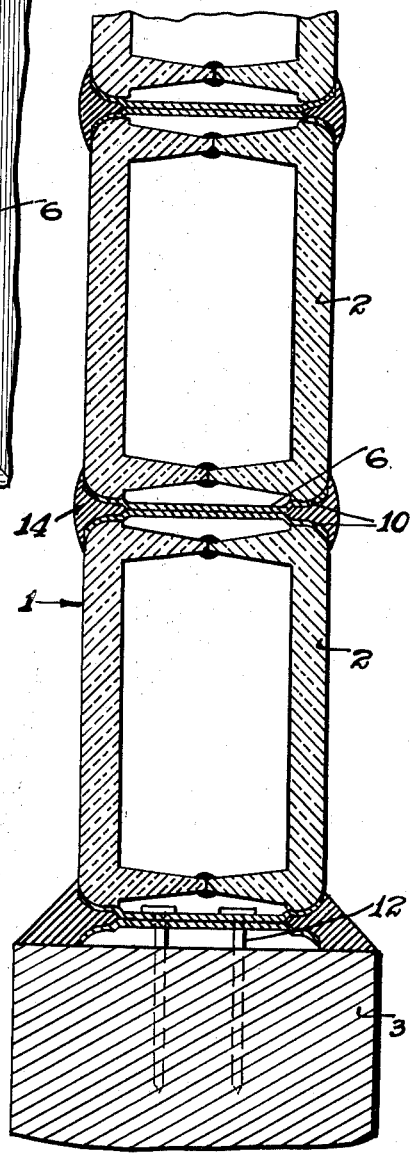
Figure 2 is a fragmentary vertical section, on a larger scale, of a similar wall construction.
Figure 3:
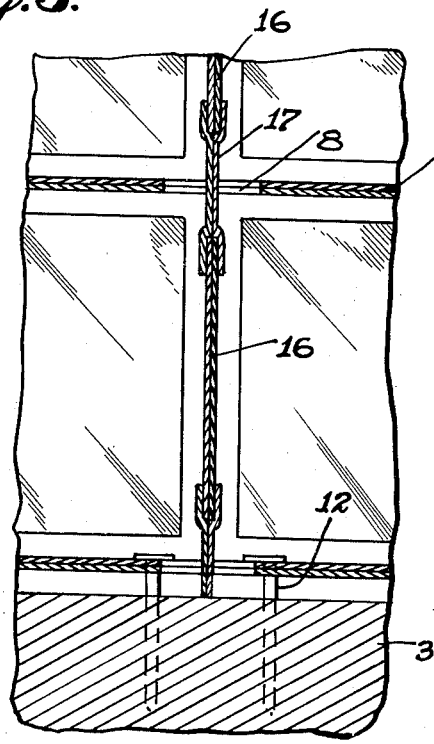
Figure 3 is a fragmentary vertical sectional view at right angles to Figure 2.

Referring to the drawings a wall 1 comprises successive tiers of glass blocks 2 mounted upon a suitable base 3. The glass blocks are separated by horizontal spacing members 6 substantially rigid in their construction.

Figure 4:
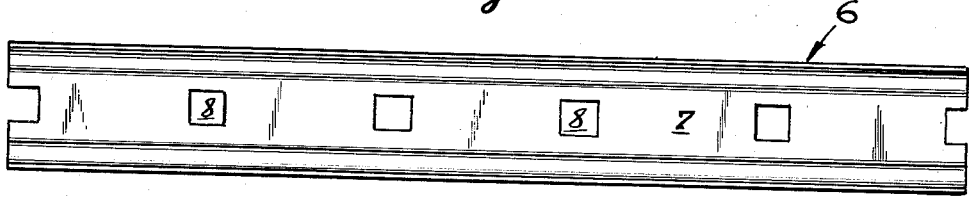
Figure 4 is a plan view of one of the horizontal spacing members.

One of the members 6 is shown more clearly in Figure 4 and includes a base portion 7 comprising strips of metal plate welded together and containing openings 8 at spaced intervals throughout the length thereof. The lateral edges of the members 6 carry spaced resilient flanges 10 offset from the base 7 and shaped to conform to the edges of the glass blocks which they are to support. The lower member 6 is secured to the foundation or base 3 by means of nails 12, or other fastening device. The spaced flanges 10 are filled with a layer 14 of mastic or other suitable caulking compound.

Each block 2 is also separated from the adjacent blocks by vertical reinforcing plates 16 which are secured together by clips 17, which extend through the openings 8 in the horizontal members 6. In ordinary practice, it is intended that the vertical members 16 serve as a filler for the space between adjacent blocks, in order that a minimum of mastic will be necessary to seal the opening between the blocks.

Figure 5:
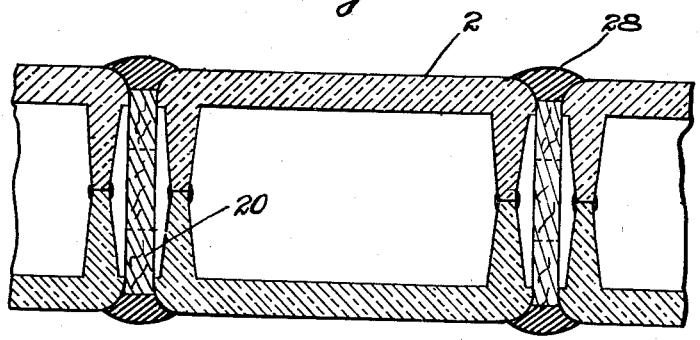
Figure 5 is a fragmentary horizontal sectional view through another form of a wall construction.
Figure 6:
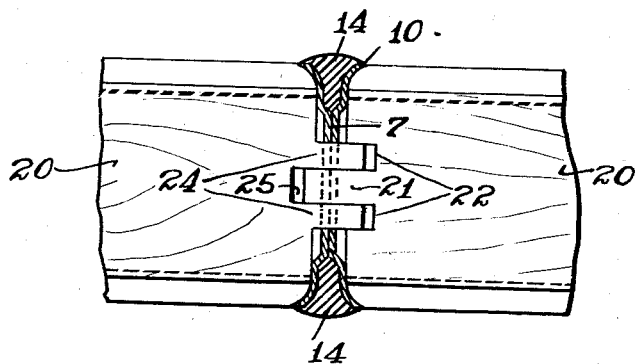
Figure 6 is a detail view showing the method of application of the vertical reinforcing members to a wall construction.

A second type of vertical reinforcing member is illustrated in Figures 5 and 6, wherein the blocks 2 mounted upon the horizontal member 7 are separated by vertical members 20, of wood, asbestos or the like. One end of the vertical member 20 is provided with a projecting tongue 21 and adjacent notches 22 and the opposite end is provided with spaced tongues 24 and an inner notch 25. This construction permits the vertical members 20 to be interlocked between the horizontal members 7. The spacers 20 are of less width than the blocks 2 and the joints between adjacent blocks may be filled with layers 28 of mastic or other caulking compound.

It will be seen that a wall constructed in accordance with the provisions of my invention will be substantially rigid and yet, at the same time, where excessive pressures are exerted thereagainst the spring flanges 10 and the mastic filling 14 therefore will be sufficiently resilient to give under the pressure, relieving the strain upon the blocks 2 themselves. Through the elimination of the use of mortar or cement the weight of the wall is carried upon the outer faces of the blocks and no undue strain is placed upon the thinner, central portion of the block and the welded joint there present. The vertical reinforcing members 16 and 20 further increase the strength of the wall construction while the mastic sealing the joints between the adjacent blocks makes the wall weatherproof.

It will at once be obvious that various modifications in the structure and the arrangement of the component parts are possible without departing from the spirit of the invention or the scope of the appended claims.

What I claim is:

1. A mounting element for securing glass blocks in superposed tiers comprising a substantially rigid metal strip, and pairs of spaced resilient spring flanges extending from the edges of the metal strip, the flanges being shaped to conform to the edges of glass blocks supported thereon.

2. In a mounting for glass blocks having projecting edges, substantially rigid, metal strips provided along their opposed edges with pairs of spaced resilient spring flanges adapted to rest upon the projecting edges of adjacent glass blocks, the flanges being offset from the rigid strip and shaped to conform to the edges of the glass blocks.

3. In combination in a wall construction, successive tiers of glass blocks having projecting edges, horizontal spacing strips provided with pairs of spaced resilient flanges adapted to engage the projecting edges of adjacent glass blocks, and vertical reinforcing members, lying between adjacent glass blocks and interlocking with the horizontal strips.

4. A wall construction as defined in claim 3 and further including a filling of mastic disposed between the flanges of the horizontal strips and between the vertical edges of the glass blocks.

WILLIAM OWEN.